Oct. 30, 1945.  E. W. FLOSDORF ET AL  2,388,134
BIOLOGICAL APPARATUS, CONTAINER AND METHOD
Filed July 18, 1938   5 Sheets-Sheet 1

Fig.1.

INVENTORS
Earl W. Flosdorf
Charles J. Westin
F. Joseph Stokes, Jr.
BY
Augustus B. Stoughton
ATTORNEY.

Oct. 30, 1945.  E. W. FLOSDORF ET AL  2,388,134
BIOLOGICAL APPARATUS, CONTAINER AND METHOD
Filed July 18, 1938  5 Sheets-Sheet 3

INVENTORS
Earl W. Flosdorf
Charles J. Westin
F. Joseph Stokes, Jr.
BY Augustus B. Stoughton
ATTORNEY.

Patented Oct. 30, 1945

2,388,134

UNITED STATES PATENT OFFICE 2,388,134

BIOLOGICAL APPARATUS, CONTAINER, AND METHOD

Earl W. Flosdorf, Lansdowne, Charles J. Westin, Philadelphia, and Francis Joseph Stokes, Jr., Laverock, Pa.; Edith Westin Wolfrom, administratrix of said Westin, deceased, assignors to F. J. Stokes Machine Company, a corporation of Pennsylvania Application July 18, 1938, Serial No. 219,858
In Great Britain June 24, 1938

18 Claims. (Cl. 34—5)

The invention relates to new and improved methods and devices for the efficient concentration, drying and preservation of biological substances such as sera, guinea pig complement, vaccines, breast milk, etc., and, more particularly, to an improved process of treating the biological material during dehydration which may include such steps as de-gassing, self-freezing, dehydration by sublimation through the action of a regenerable chemical desiccant and vacuum.

Other features are the improvement in the apparatus for the efficient practice of the dehydration and sealing process including convenient means for the regeneration of the desiccant; and the improvement in providing suitable receptacles for use as containers for individual doses or multiples thereof during dehydration, sealing, storing, distribution and restoration of the biological material. The invention includes new and novel means for connecting the small size containers, for constricting the exhaust tubes after the admission of dry, sterile air, the re-evacuation and final sealing of the container.

The purposes of our invention agree with the features listed by Earl W. Flosdorf in his application Serial No. 131,832, filed March 19, 1937, now Patent Number 2,215,265, issued August 19, 1940. These are:

To eliminate loss of quality;
To favor retention of volatile constituents;
To prevent chemical changes;
To prevent multiplication of micro-organisms and changes in the product caused by such contaminants;
To increase the keeping qualities for an extended period; and
To improve stability.

It is also the purpose to provide an article of manufacture or package consisting of a dry biological substance of superior stability in amounts suitable for clinical use, conveniently and easily restorable to original consistency by adding water, packaged in the original individual receptacle which may be of ordinary flint-glass, aseptically and hermetically sealed under vacuum.

Our invention has also for one of its purposes the provision of a simplified and improved apparatus for the efficient and economical production of packages containing biological products embodying the above-enumerated qualities. The packages may be of varying kinds, types and sizes, the general classification being as follows:

(a) An all-glass receptacle aseptically sealed under the original vacuum. Such a product is, for example, a test-tube confining dehydrated micro-organisms.

(b) An all-glass receptacle aseptically sealed under secondary vacuum.

(c) An all-glass receptacle sealed non-aseptically under a secondary vacuum.

(d) A rubber-stoppered flint-glass receptacle aseptically or non-aseptically sealed under a secondary vacuum.

Another purpose is the simplification of the treatment of the containers or receptacles and the methods of sealing them.

Another purpose is to provide an efficient means for the economical regeneration of the desiccant.

Some of the new and novel features included in our apparatus are:

A unitary vacuum-dehydrating and regenerating chamber;

Retaining baskets and/or trays for the regenerable desiccant;

Means providing tortuous paths exposing large surface areas of the desiccant to the vapors when dehydrating and to the warm air when regenerating;

Means in the baskets or trays for testing the condition of the desiccant;

Manifolds for the freezing, dehydrating and sealing of a plurality of individual containers;

Container supporting-trays providing a maximum air circulation and heat transfer;

The method of and devices for regulating and holding the vacuum at suitable pressure for de-gassing and for enabling quick attainment of high vacuum for self-freezing;

Means for efficiently regenerating the desiccant;

And other features and improvements in the apparatus and devices resulting in greater efficiency and economy as shown in the appended drawings and/or hereinafter described.

The feature of having a unitary vacuum-dehydrating and regenerating chamber is of exceptional convenience and desirability in any apparatus used in biological production, operated in connection with a hospital laboratory, or in similar institutions. Heavy labor incident to the transfer of two or three hundred pounds or more of desiccant is avoided because the separate oven or regenerating chamber is eliminated. This also results in a considerable saving of time and reduces to a minimum time-out for regenerating. Another advantage with this combination unit is that any handling of the desiccant, which would have a tendency to break up its granular form and shorten its useful life, is entirely unnecessary.

The advantages and benefits derived from the use of a direct regenerative chemical desiccant, as against the heretofore used expensive condensers with their also costly but necessary low-temperature refrigerating-mixtures as described in the applications for U. S. Letters Patent by Earl W. Flosdorf, Serial No. 131,832, filed March 19, 1937, now Patent Number 2,215,265, issued August 19, 1940, and Serial No. 178,537, filed December 7, 1937, now Patent Number 2,225,627, issued December 24, 1940, also apply in this case. In the above applications, the trade-name "Cryochem" was selected to identify the process wherein a regenerable desiccant is used and for the resulting product. This trade-name "Cryochem" is therefore also used in this application to distinguish from that of the "Lyophile" process and apparatus described in the applications for Letters Patent by Earl W. Flosdorf, Serial Nos. 54,148, and 54,149, filed December 12, 1935, now Patent Numbers 2,199,816 and 2,199,815, respectively, issued May 7, 1940, and Serial No. 54,450, filed December 14, 1935, now Patent Number 2,163,996, issued June 27, 1939.

It has been found that in many cases the "Cryochem" products are superior to that of the "Lyophile" product because of the vacuum-degassing, self-freezing process, which produces a complete removal of entrained gases and thereby reduces the rate of any subsequent deterioration which might be caused in the "Lyophile" product by the presence of gases, such, for example, as oxygen or carbon-dioxide. The "Cryochem" product is still further superior to the "Lyophile" because in its preparation it is only acted upon by an aqueous desiccant and therefore only water is removed, while other volatile constituents remain. The reason for this is that in the "Lyophile" process the exceedingly low temperature in the condenser withdraws not only water but any and all other volatile constituents, because the vapor pressure of all constituents is decreased to the temperature of the condenser, while with the "Cryochem" process only the vapor pressure of the water is reduced.

Furthermore, the vacuum-degassing, self-freezing process in many cases produces a fluffy frozen mass which permits more rapid removal of the water. The resulting dry product is found to be more rapidly soluble not only because of its having been dried more rapidly but also because the fluffy form is retained in the dry product to permit better contact with the water used in its restoration.

A number of desiccants are available for use in the "Cryochem" process. At present, however, the generally preferred type is that known by the trade-name "Drierite" described in U. S. Letters Patent No. 1,887,349, granted to William A. Hammond, November 8, 1932. Aside from its low first cost, it is preferred because there are no acid or other deleterious vapors present in it to affect the quality of the product.

The resulting product is a very porous solid occupying the same volume as the liquid from which it was prepared. Its content of antibodies and complement suffer no detectable loss in the processing, and the rate of subsequent deterioration is reduced to a small fraction of that of the same product in the liquid state. The porous "Cryochem" material re-dissolves with remarkable ease and completeness when distilled water is added. Typical materials which can be preserved by the "Cryochem" process are serums of all types, guinea pig complement, bacteria, viruses, vaccine, breast milk, food products and other desirable substances subject to deterioration from moisture and/or heat.

The size and the shape of the containers used with the apparatus and the method of sealing have a definite effect on the resulting product. Various types of glass containers with rubber stoppers or a combination of glass and rubber are quite satisfactory for some products. For some products, however, an all-glass container is necessary. It may be of either "Pyrex" or ordinary flint-glass and the method used in sealing-off the container depends on the kind of glass used. New and novel methods for the proper and efficient sealing of the containers, whether made from "Pyrex" or flint-glass, will be described hereinafter.

For a better exposition of our invention, reference is made to the annexed drawings in which the embodiment of a suitable apparatus illustrating the principles of our invention is illustrated but we do not limit ourselves to the specific construction shown.

The drawings also include illustrations of the new and novel type of containers used in the practice of the invention.

Referring to the drawings.

Figure 1:
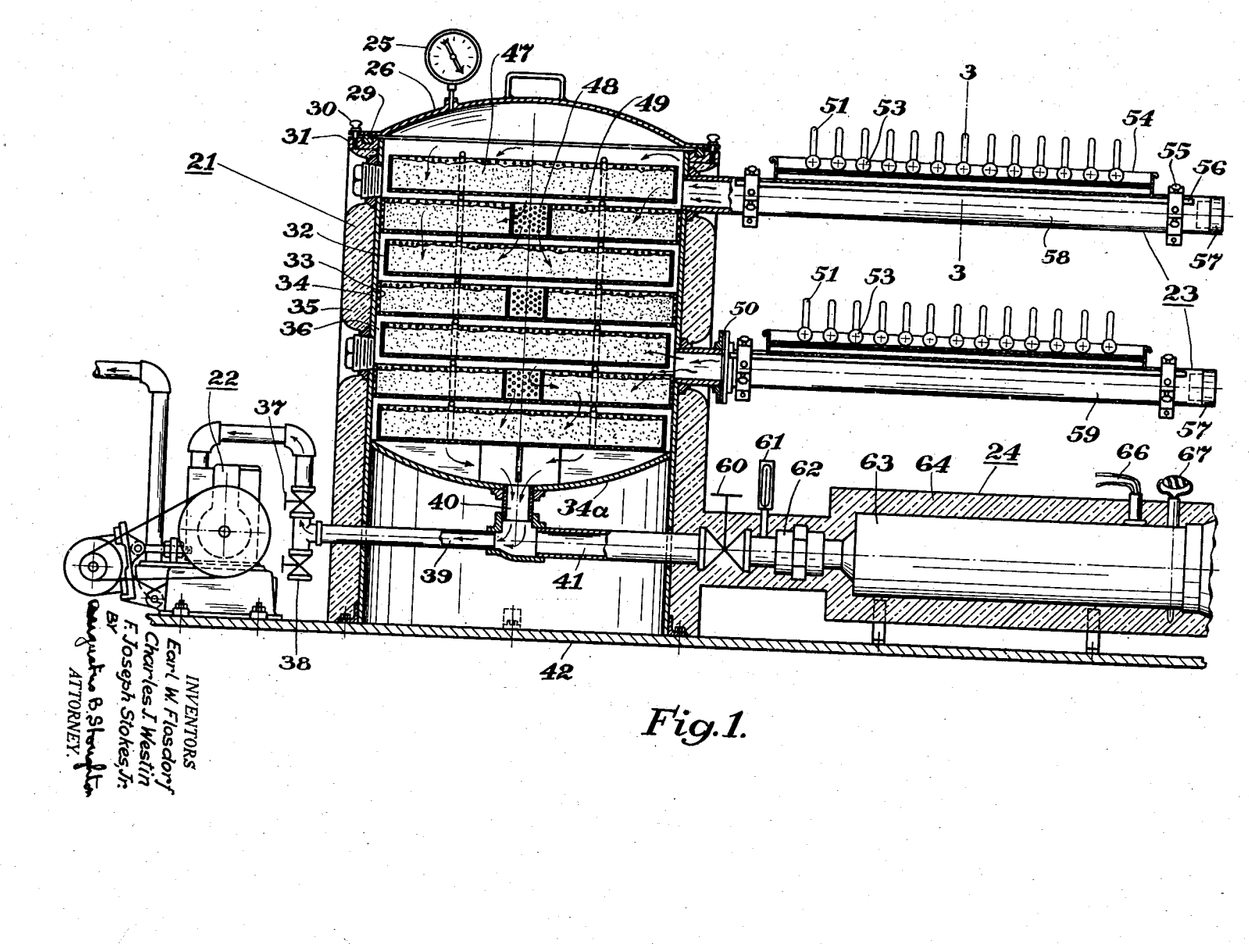
Fig. 1 represents a front elevation, mostly in section, of the apparatus as in use while dehydrating.

Referring to Fig. 1, the apparatus when used for dehydrating consists in combination: of a vacuum-desiccant chamber 21 with one or more manifolds 23 attached to the chamber, each manifold being provided with means for attachment of a plurality of containers, and a vacuum-producing means 22 also associated with the vacuum-desiccant chamber.

Figure 2:
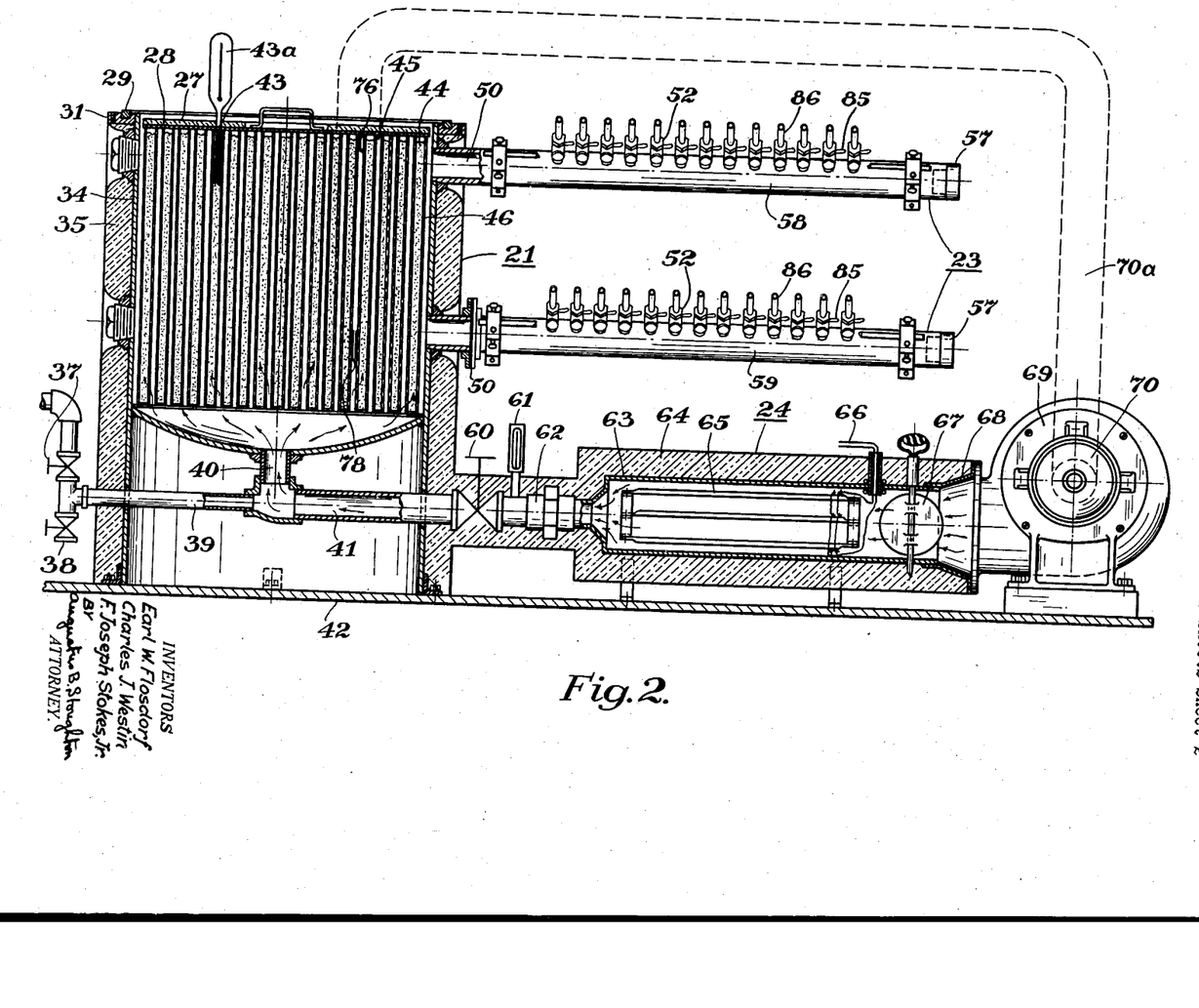
Fig. 2 represents a front elevation, mostly in section, of the apparatus as arranged for use in regenerating the desiccant.

Referring to Fig. 2, the apparatus consists in combination, when used as a regenerating unit, of the desiccant chamber 21 and the air-heating and circulating device 24.

The vacuum-dehydrating chamber, containing the regenerable desiccant, may be of any suitable shape but for our purpose we prefer the cylinder-tank-type 34, provided with a dished bottom 34a, having an inlet-outlet 40 of ample size and suitable for connection to either the vacuum-producing means 22 or the hot air circulating unit 24. The top or open end of the chamber may be covered with a dished head 26, having provision for the attachment of a vacuum gauge 25, and arranged so it may be clamped down vacuum-tight by means of screws 30 against a gasket 29, fitted into the flange 31 of the chamber 34. To minimize the effect of the surrounding air temperature as well as to keep radiation losses down, the chamber may be surrounded or covered by some insulating material as at 35. In the side wall of the chamber, provision is made for attaching one or more manifolds 23. The connection may be either a screwed joint or the companion flange type. The chamber may be filled with any regenerable desiccant. We prefer to use "Drierite" because this desiccant is the most economical and appears to possess more desirable properties than any other desiccant available at present. The desiccant may be placed in the chamber in a solid mass and without any provision for the labyrinth of passages shown in the drawings. In order to obtain the greatest efficiency, however, both in the dehydrating and the regenerating cycles, we prefer to use trays or baskets and support the desiccant in such a manner that large areas of it are exposed and a tortuous path provided for the vapor or the hot air as the case may be.

Figures 3, 4, 5, 6, 7:
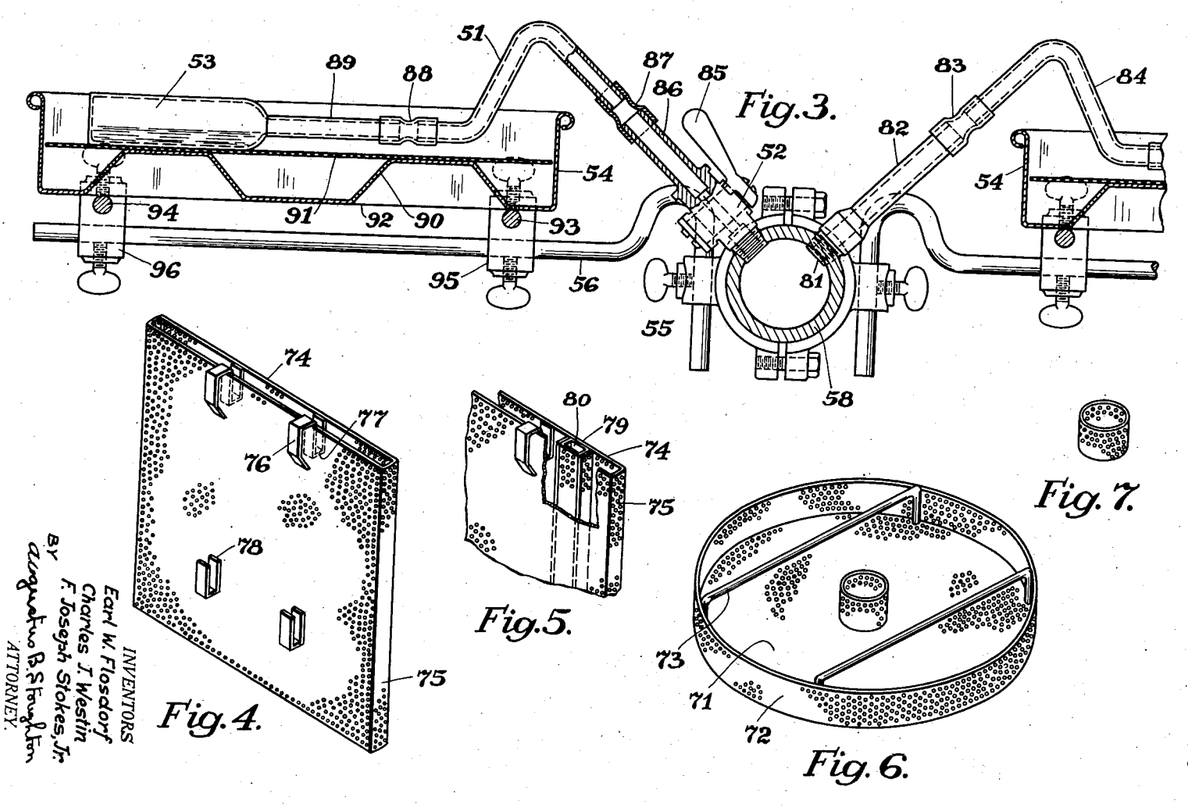
Fig. 3 represents a section on line 3—3 of Fig. 1 through one of the manifolds showing in an enlarged, fragmentary, sectional, front elevation the relation of parts while dehydrating.
Fig. 4 is an enlarged, perspective view of the type of basket shown in use in Fig. 2.
Fig. 5 is a fragmentary, perspective view of the same basket as shown in Fig. 4, but with the test block inserted.
Fig. 6 is an enlarged, perspective view of the horizontal type of basket shown in use in Fig. 1.
Fig. 7 represents the cylindrical air duct placed in alternating baskets as shown in Fig. 1.

Two types of "desiccant baskets" are shown. A vertical type of basket is shown in Figs. 2 and 4. A horizontal type is shown in Figs. 1 and 6. Either type has proved very efficient and, in addition, it makes it easy to handle the 300/400 lbs. of desiccant when necessary to make a change.

The horizontal type of desiccant basket may be made from any suitable wire screening or perforated metal in the shape shown in Fig. 6. These baskets are usually provided with a flat bottom 71 of an outline suitable to the shape of the chamber into which it must fit and a rim 72 of 2" to 3" in height. It will be noticed from Fig. 1 that the baskets are not all of the same diameter but every other one is made slightly smaller as at 32, leaving an air space 36 between the rim of the basket and the chamber wall. The basket shown at 33 fits snugly, thereby shutting off the free air passage and forcing the air or vapor to pass underneath or between the baskets and/or up through or down through the perforation and voids in the desiccant. In the basket that fits snugly into the chamber, we may provide a cylindrical passage 48 in the form of a tube made from perforated metal or wire screen and place this somewhere in the approximate center of the basket before filling it with the desiccant. In the top basket the desiccant is shown at 47, and in the second basket from the top the cylindrical passage is shown at 48. An enlarged view of this cylinder is shown in Fig. 7. To support the baskets one on top of the other, bars 73 are placed across and attached to the top of the rim 72. These bars also are a convenience when lifting the baskets in or out of the chamber.

The vertical basket shown in Fig. 4 may also be made from either wire screen or perforated metal and in shape to suit the chamber outline. In general, they may be spoken of as the envelope-type because they are so high and narrow with sides closed and only the top open. The particular one shown in Fig. 4 is of rectangular shape with the open top 74 terminating into the narrow end 75 and, of course, a similar bottom. Straps are provided at 77 to brace and support the flexible sides and these may be extended to the outside so as to form the spacer 76. Another type of spacer is shown at 78. Now referring to Fig. 2, these envelope types of baskets are placed side-by-side in the chamber 34 and the spacers 76 and 78, just referred to, will hold the baskets sufficiently apart as indicated at 45, to provide air passages and thus expose large areas of the desiccant to the vapor and air. The desiccant is shown at 44 within the basket 46.

*The desiccant.*—As mentioned above, various types of chemical desiccants are available but the type generally preferred at present is that known by the trade-name "Drierite" and described in U. S. Letters Patent 1,887,349, granted to William A. Hammond, November 8, 1932. This desiccant is anhydrous calcium sulfate and possesses a sufficient affinity for water, both to produce a low aqueous tension and to do it rapidly and with a sufficiently high temperature coefficient of reversibility to be completely regenerable without vacuum. The aqueous tension of the half-hydrate which is produced is 0.004 mm. at 25° C.; this will reduce the final residual moisture content of the dried biological to the low level required. Furthermore, the degree of porosity of calcium sulfate when obtained in the form of "Drierite" is so great and remains so great that the rate of removal of water vapor is more rapid than by any other means we have as yet encountered. It is a material of low initial cost and can be regenerated time and again at a minimum cost because the regeneration may be carried out under atmospheric pressure.

Calcium sulphate has no vapor pressure or volatile substance and can therefore cause no harmful effects on labile material such as has been reported with sulfuric acid or acid phosphoric anhydride. During regeneration, calcium sulfate hemi-hydrate will not lose its original porosity as calcium chloride does. Calcium sulfate has affinity for water only; this is an advantage in the case of many products, although it may occasionally be a disadvantage in certain types of work.

We do not wish to be limited to the use of calcium sulfate although at present this type of regenerable chemical desiccant appears to be the most efficient and most economical. Any desiccant that meets the following brief specifications will serve our purpose quite satisfactorily:

A desiccant which is regenerable without vacuum, at the temperature below 350° C., yet with a very low (0.001 to 0.05 mm. Hg) aqueous tension at 20° C., which maintains this aqueous tension until it has reacted at least to 50% of its theoretical capacity, and has a high degree of porosity and/or effective reacting surface which is not altered or rendered appreciably less efficient upon absorption of minimal amounts of water vapor; and one which does not evolve deleterious vapors during the dehydration cycle and does not fuse during the regeneration or during the desiccation cycles.

The size of the vacuum-desiccant-chamber 21 must be large enough to hold an ample supply of desiccant or water absorbent. The amount of desiccant needed depends, of course, first, on the type used; and, secondly, on the amount of water vapor to be removed in the apparatus. Enormous volumes of water-vapor are evaporated even from a small unit volume of a frozen substance when kept under high vacuum for an extended period of time. Sufficient absorbent material should therefore be available in the system to efficiently absorb the vapors rapidly enough so as not to interfere with or retard the evaporation. When "Drierite" is used, it has been found that the greatest efficiency is obtained by allowing 100 pounds of desiccant to every 500 milliliters. This proportion is only ¼ of the total practical capacity of the "Drierite." This proportion has been found to be the most efficient for practical operation and insures a long life of usefulness for the "Drierite." It also means that 2 liters or 4 runs of 500 ml. per 100 lbs. can be made before regeneration is necessary.

The stoichiometrical capacity of calcium sulfate ("Drierite") to react with water vapor to produce the hemi-hydrate is 6.6% of its weight. This theoretical capacity may be obtained. Under practical conditions, however, the rate of reaction starts to fall below the level desirable for this process after 75% of the theoretical limit has been reached. It may be noticed that among desiccants available this is a very high value. It has been found that 2 liters of serum or similar substances per hundred pounds of "Drierite" is the most satisfactory ratio in practical operation.

The reaction to produce the hemi-hydrate; however, is exothermic and the maximal quantity of serum which can be dried in a single run has been found to be one-half of the total capacity; namely, one liter of serum per 100 pounds of calcium sulfate. If this quantity is exceeded, the temperature of the "Drierite" rises to the point where it can no longer react with water at a sufficiently rapid rate. Unfortunately, dissipation of heat in vacuo is very slow. It has also been found that the life of "Drierite," i. e., the number of regenerating cycles to which it may be exposed without undue loss of efficiency, is dependent upon the condition of temperature to which it is subjected; therefore, although it will dry one-half of its total capacity on a given run, the life of the "Drierite" is lengthened and the maximum efficiency obtained if the proportion is held to the figures given above for each single run.

The desiccant chamber is therefore proportioned according to the above principle to take care of a predetermined number of manifolds and manifold outlets. It should, however, be noted that the amount of water removed per run may be as much less as desired and no greater cost incurred. It only means that so many more runs can be made before regeneration is necessary. Herein lies one great advantage of this process as compared with the "Lyophile" where low temperature condensers for the removal of the vapors are used. In the latter, the losses due to thermal leakage are large and remain constant, irrespective of how small the run volume may be. Another decided disadvantage with the "Lyophile" low temperature condensers is the fact that the losses due to thermal leakage are constant, even when the apparatus is not in use.

In the "Cryochem" apparatus, the desiccant chamber is therefore so designed that the apparatus may be used for four or more runs without regeneration, the volume of material to be desiccated being ¼ or less of the total capacity of the "Drierite." Occasionally, if necessary, these amounts may be exceeded up to ½ of the total capacity. Another advantage to be noted is that, if the apparatus is kept completely closed between runs, there will be no deterioration of "Drierite" when not in use.

As will be noted from the above description, a definite relationship, therefore, exists between the size of the vacuum-desiccant-chamber and the number of manifolds, number of outlets on each manifold, and size of containers that can be efficiently dehydrated in the system.

*Test plugs.*—For convenience in testing the condition of moisture content of the desiccant, test plugs 80, Fig. 5, are provided in one or more of the baskets. They consist of a small basket made so as to conveniently fit into a space provided for that purpose in the larger basket 46. At stated intervals, these test plugs may be removed and a moisture determination made on the contained desiccant.

*Vacuum requirements.*—Any reliable high-vacuum-producing means, such as the motor-driven pump 22, may be used. It is desirable to have it connected as close to the vacuum chamber 21 as practical and the ducts of ample size so that a high vacuum may be obtained quickly when needed. In Fig. 1 we have shown a duct 39 connecting outlet 40 from chamber 21 through a valve 37 to the vacuum pump 22. Valve 37 is used for two purposes: to choke down duct 39 during the de-gassing period and keep the vacuum of the system just above the frothing point of the drying substances; and to completely shut-off the pump after the high vacuum is obtained, providing the system is perfectly vacuum-tight. A valve 38 is also provided. This is used to help regulate the vacuum during de-gassing and as a vacuum break to admit air to the system after the drying is completed on substances that satisfactorily may be sealed under atmospheric conditions and non-aseptically.

The pump should be of sufficient size and capacity so that the pressure in the dehydrating system can be quickly brought to the range of 2.5 to 1.0 mm. Hg. At this pressure, freezing will almost immediately take place and drying from the frozen state will proceed. The sudden freezing of course presupposes that materials containing dissolved gases have already been de-gassed as explained under "De-gassing procedures."

There again attention is directed to the decided advantages secured through the present invention both as to improvement in the vacuum requirement and in the greater efficiency of the new "Cryochem" process over those heretofore in use. As indicated above, pressures on the order of 2.5 to 1.0 mm. Hg or 2500 to 1000 microns are ordinarily used in the apparatus of the present invention, although not at all satisfactory for devices using low temperature condensers. In the "Cryochem" process, the critical pressure point is on the order of 2000–2500 microns and a very satisfactory rate of drying is obtained at 600–700 microns. In the processes heretofore available, such as the "Lyophile" which is limited to the use of low temperature condensers, the critical pressure point is at 700 microns. If the air pressure within the system is above this point (700 microns), the operation proceeds insufficiently fast to maintain the material in the frozen state even though it originally was frozen to a low temperature, and pressures below 250 microns are necessary in order to get a fair rate of drying efficiency. Losses in pressure through leaks in the multiplicity of connections and the joints in any device of this kind must be carefully guarded against but cannot be entirely eliminated. A lower pressure is therefore used as a matter of safety and this has been found to be between 300 and 400 microns for the "Cryochem" apparatus while "Lyophile" apparatus require between 10 to 50 microns.

The above figures, comparing vacuum requirements for the system heretofore used with the present invention, indicate that the rate of fixation of the water vapor by the "Drierite" (calcium sulfate) is so much greater than that of the low temperature condenser that the mean-free path of the water vapor molecules can be much shorter without preventing maintenance of the frozen state by evaporation. The greater rate of fixation of water vapor is due to the much greater effective surface of the calcium sulfate particles as compared with the low temperature condensers. Even the interior of the porous particles of calcium sulfate react with the water vapor. This also accounts for the greater success obtained with "Drierite" as the desiccant in the self-freezing procedure. The final equilibrium vapor pressure is no lower; the rate of attainment is much more rapid than with low temperature condensation.

The manifolds consist of tubes of a size proportioned to take care of all the vapors from a plurality of outlets without offering resistance to the vapor-flow. Any number of manifolds may be attached around the chamber 21, depending on the size of the chamber and the amount of vapors the desiccant within it can efficiently absorb. Only two manifolds, 58 and 59, are shown, each with twenty-five outlets 52, placed in two rows at an angle of about 45° to the horizontal as shown in Fig. 3. One end of tube 58 is screwed directly into the side wall 34 of chamber 21. An alternate scheme of attaching the manifolds is shown for tube 59 which is held in place by means of companion flanges 50. The outer ends of tubes 58 and 59 may be closed vacuum-tight in any convenient manner as, for example, with stoppers 57.

The outlets or container-connectors may be any suitable number consisting of simple tubes as at 82, Fig. 3, attached vacuum-tight at 81 to the main tube 58, and having provision on the outer end to receive the rubber tubing 83, holding the glass connector 84 in place. The elaborate and expensive quick-acting type of outlets heretofore necessary in the "Lyophile" apparatus are no longer needed in the "Cryochem" apparatus; because of the efficient action obtained through the use of the desiccant, the freezing procedure is materially changed.

We have, however, found that the type of outlet shown at 81 does not fill the needs of all conditions. In order to make the apparatus universal, the outlets should be so arranged that each individual glass container can be sealed-off separately in an aseptic condition and/or without influencing the adjacent containers or the apparatus as a whole. To provide for this desirable feature, the novel construction of a separate vacuum-tight valve 52 is provided in each outlet.

One side of the valve 52 is attached vacuum-tight to the manifold tube 58 and the other side is provided with a suitable nipple 86 to receive the rubber tubing 87 holding the glass connector 51 from container 53 in place. Nipple 86 may, in some cases, be replaced by a tapered tube 97, Fig. 14, large enough to receive the rubber stopper 98. As shown in Fig. 3, the outlets are attached in an inclined position with the container-attaching end pointing upward. The angle may be anywhere from 15 to 90° with the horizontal. The purpose of this is to guard against any possibility of contamination either during the attaching of the containers, during the drying cycle, or the sealing-off period. It also makes it more convenient in placing the containers in a horizontal position. The manifolds with their permanent outlets may not be sterile but, through the construction indicated, no bacteria or other microorganism can fall into the container by gravitational forces. The containers as well as the glass and rubber connectors are, of course, sterilized before connection and all through the drying period the currents of air and vapors tend to carry any existing contaminants away from the product. The inclined position of the outlets is therefore of main importance while attaching the sterile containers and after closing valve 52 for the sealing-off operation. The importance of valve 52 in the individual outlets will be more specifically pointed out and described in connection with the sealing-off process. It may briefly be mentioned here that the novel combination of individual valves for each outlet of the manifold makes it possible to use flint or other inexpensive glass which does not have a particularly low coefficient of thermal expansion, such as is possessed by the very much more expensive "Pyrex" variety, and still seal-off the product in an aseptically unchanged condition. Heretofore only "Pyrex" glass could be used for the process of sealing-off under vacuo because the diameters needed for proper drying were too large to permit the proper sealing of ordinary glass tubes. The economy and efficiency resulting from the use of an all-flint glass container has extended the usefulness of the process into fields where the cost of "Pyrex" heretofore made it commercially impossible.

The container trays 54, best seen in Fig. 3, used to support the containers during dehydration, are long rectangular basins (length to suit manifold and width to suit containers) supported by brackets 55 clamped to the manifold 58. Adjustable arms 56 may be used to extend out under the bottom 92 of trays 54. Additional adjustable brackets 95 and 96 with cross-rods 93 and 94 may be provided on arms 56 to suit special conditions. Trays 54 may be made from any suitable material, metal, hard rubber, porcelain, etc., but preferably from a non-rusting type. The bottom 92 may be flat or corrugated as shown at 90 and a wire screen 91 placed in the tray for the containers to rest on so as to keep them slightly above the bottom for free circulation of air all around as well as to permit any condensate forming on the containers to drain off.

As freezing mixtures for the rapid chilling of the containers are only required in some very special cases in the practice of the "Cryochem" process, no insulation of the trays is needed, resulting in a considerable economy as well as convenience. Nor is there any need for drain-cocks and other contraptions heretofore needed in similar devices.

The air-heating and circulating device 24,

Fig. 2, may consist of a heater chamber 63, heavily insulated as at 64, with one end connected at 62 through valve 60 and duct 41 to the bottom outlet 40 of the desiccant chamber 21. At the opposite end 68 is connected a fan 69 or similar device which produces a rapid current of air directed to pass through the heater chamber 63 and around heaters 65 placed within it. For the purpose of illustration, we have shown electric heating elements 65 connected to a source of current supply at 66, but any other heat-supplying means such as gas, steam, etc., may be used. To regulate the temperature of the air passing into the desiccant chamber 21 through opening 40 is very important. It is evident that the bottom layers of desiccant are closest to the source of heat and would become over-heated and destroyed before the top layers had reached the needed temperature for regeneration. The control of the temperature is obtained through the novel arrangement of controlling the volume of air passing over the heat-supplying means. This is accomplished by adjusting intake 70 on fan 69 and also by setting the damper 67. The temperature may vary from 150° C., to 250° C., but for efficient regeneration it should be maintained from 175–200° C. For the purpose of checking the temperature of the air passing into the chamber 21, a thermometer 61 is provided in the connection at 62. For rapid regeneration, it is desirable to have a large volume of fast moving air at the proper temperature. Air under pressure might be used if available.

Figures 14, 15, 16, 17, 18, 19, 20, 21, 22, 23, 24, 25:
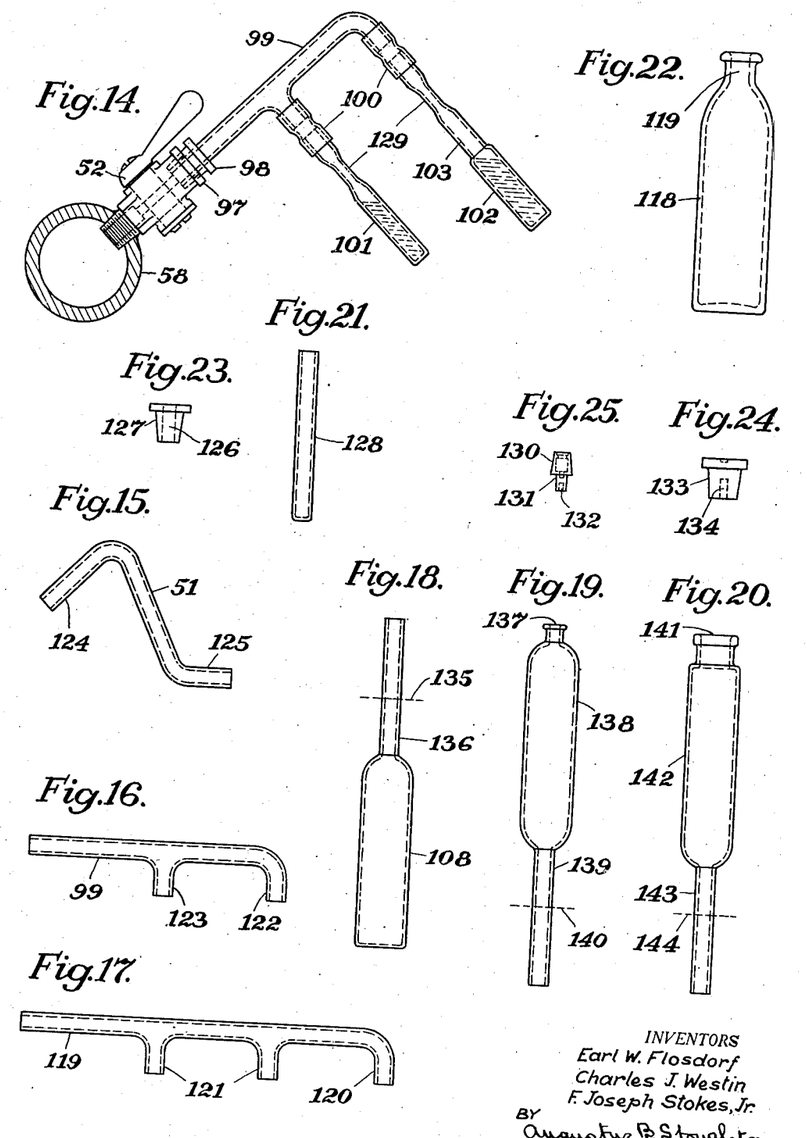
Fig. 14 shows two types of containers in multiple connection on the manifold.
Figs. 15, 16 and 17 show different types of connector tubes.
Figs. 18, 19, 20, 21 and 22 show different types of suitable containers.
Figs. 23, 25 and 24 show three typical types of stoppers.

*Proportion of containers and connectors.*—In order to assure a large surface for the evaporation, the containers should be of a size and shape adapted to hold the material to be dried in such a position that a favorable surface-volume ratio exists and a maximum surface area is exposed to aid in efficient dehydration. They should be of convenient shape to handle when sterilizing, filling, freezing, sealing and storing. In addition, they should include provision for the easy introduction of the restoring liquid. In general, they must be of at least twice the capacity of the amount to be preserved. Long cylindrical vials have been found most efficient. The all-glass container, Fig. 18, affords the maximum safe protection but for some products the combination glass and rubber has been found satisfactory as well as desirable because of the somewhat greater ease of restoring the content to liquid form and withdrawing it aseptically. Heretofore, in order to avoid using the costly "Pyrex" sealing tubes, the rubber stopper was provided with an integral rubber sealing tube and special devices resorted to in sealing. This invention, however, eliminates any further need for either "Pyrex" or rubber sealing tubes and provides an all-glass container as shown in Fig. 18, where the cylindrical body 108 of the container-vessel is formed with an integral sealing tube 136. In this connection, it should also be noted that the use of such an all-glass container made from ordinary flint-glass has been made possible only through the new and novel method of sealing herein disclosed. The diameter of the exhaust tube 136, Fig. 18, must be of large bore, at least 4 mm. in diameter for containers to hold serum up to 25 ml.; and 7 mm. for quantities up to 100 ml. In diameters as large as those given above, only tubes of "Pyrex" glass will withstand the sealing under vacuo but, through the arrangement of parts and this new process, ordinary flint-glass tubes are successfully sealed under aseptic conditions.

*Containers—for general use.*—For optimum results in the practice of the "Cryochem" process, care must be exercised in the selection of the container used. While the same containers may be used as were described by Earl W. Flosdorf in connection with the "Lyophile" process, new and improved types are a part of this invention as well as a new and novel method of sealing the containers. This new sealing method overcomes the serious handicap of the "Lyophile" process where, when all-glass containers were required, these containers of necessity had to be made from the expensive "Pyrex" glass. The length of the storage period desired for the product in many cases determines the type of container that should be used. Containers with rubber stoppers such as are shown in Fig. 22, or in Figs. 19 and 20, are quite satisfactory for relatively more stable products and will keep such products in perfect condition for a year or more while with very labile substances, such as a virus influenza, the combination rubber and glass containers could only be depended on for a maximum safe storing period of less than a month. For long periods, the diffusion of moisture and air through the extensive area of thin rubber in stoppers of the type shown in Figs. 24 and 25 is too great, particularly if the temperature or relative humidity, or both, are high. Heretofore, even when rubber stoppers were satisfactory, it was necessary, unless they were provided with the somewhat unsatisfactory integral rubber exhaust tubes, to use sealing tubes of "Pyrex" glass for sealing under the original vacuum.

Figures 8, 8A, 9, 10, 11, 12, 12A, 13:
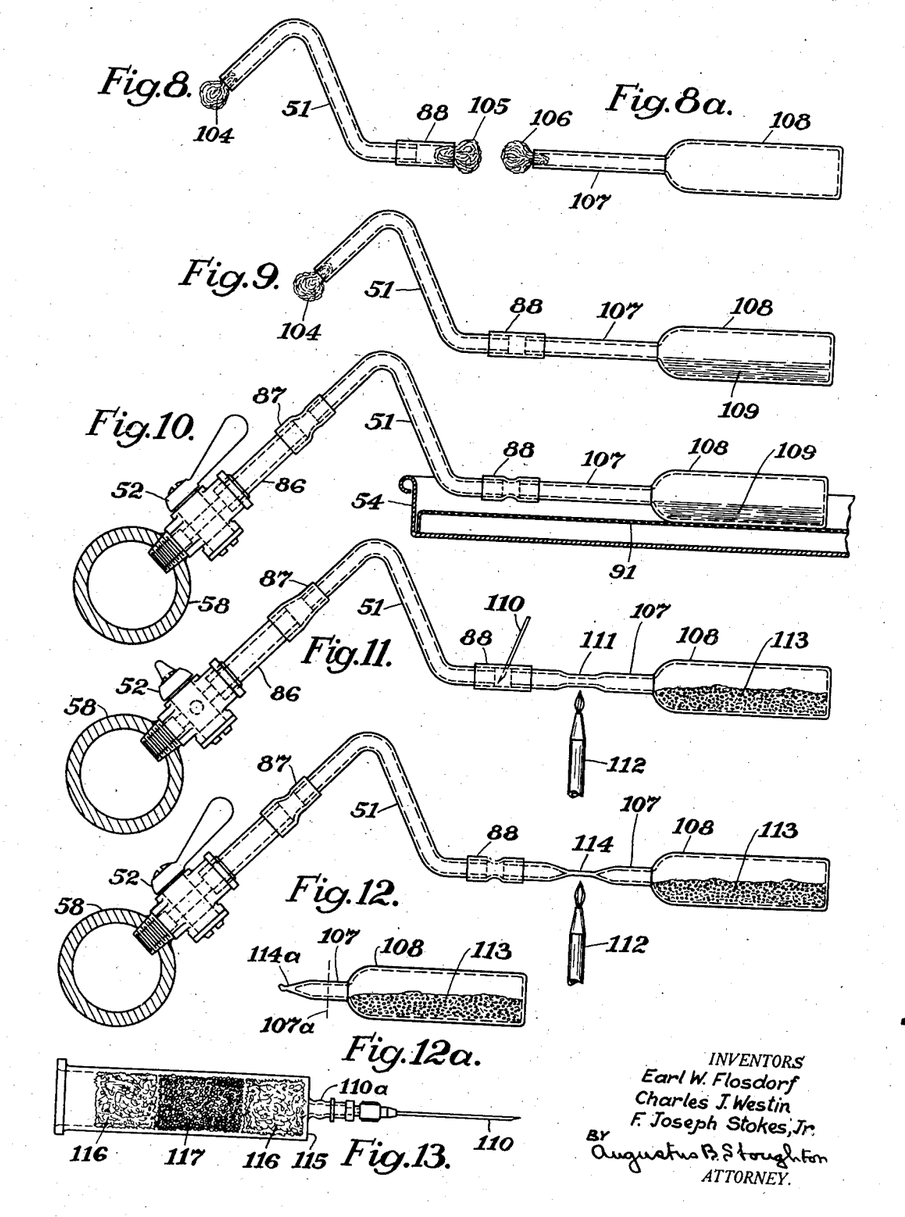
Figs. 8 and 8a show an S connector tube and container as sterilized before filling.
Fig. 9 shows how the sterile tube and container are partly assembled before attaching.
Fig. 10 shows a filled container as attached to the manifold.
Fig. 11 shows the container with the sealing tube being restricted.
Fig. 12 shows the container with the sealing tube as finally sealed.
Fig. 12a represents a typical finished product.
Fig. 13 shows an "air dryer and sterilizer."

The limitation to the use of "Pyrex" has now been overcome by the type of containers and method of sealing developed as part of this invention. When rubber stoppers are desirable, the type of container shown in Figs. 19 and 20 may be used. It should be noted that the container takes the form of a relatively long cylinder which is reduced at one end into an ordinary bottle neck style of suitable size to receive certain types of rubber stoppers while the other end is drawn down into a tube of suitable diameter for efficient exhausting and of a length convenient to assemble on the apparatus and providing space for constricting and sealing. With the container shown in Fig. 20, the vaccine rubber stopper shown in Fig. 24 is used. The stopper body 133 fits tightly into the neck 141 of the container. The recess 134, corresponding with a dimple in the outside surface of the stopper, provides a thin membrane to make it possible for the user to pierce through with the syringe needle when adding water to restore the dry content in preparing it for withdrawal and use. The small diameter exhaust tube 143 is, after the container is filled, attached to the apparatus as may be seen in Fig. 3, at 88 and 89, or as shown step-by-step in Figs. 8, 9 and 10. A line 144 is shown across the tube 143, indicating the point where the tube may be reduced in diameter as shown in Fig. 11 at 111 by means of a flame 112, so that the process of sealing under vacuum may be performed as shown in Fig. 12 at 114. The container shown in Fig. 19 is of a slightly different shape. It has the long cylindrical body 138, but the neck 137 is considerably reduced so as to take the hooded vaccine stopper shown in Fig. 25, the body 131 fitting into the neck 137 while the hood 130 is pulled down over the outside of the neck 137 to provide additional protection against the diffusion of moisture and air through the joint.

The stopper is provided with the same recess 132 corresponding with a dimple in the outside face as was pointed out in the stopper shown in Fig. 24. The body 138 is drawn down into a small diameter tube 139 which, after filling, is connected to the apparatus as previously described and shown in Fig. 3. A line 140 across the tube indicates where this may be reduced in diameter as shown in Fig. 11 and subsequently sealed off as shown in Fig. 12.

An all-glass type of container is shown in Fig. 18. This has the long cylindrical body 108 closed at one end and at the other end the exhaust tube 136 in proportion to suit its size. The line 135 across the exhaust tube 136 indicates the probable point where the tube may be reduced or constricted in diameter and subsequently sealed as indicated in Figs. 11 and 12. Through the novel process of turning off the manifold valve 52, at the completion of the dehydration period and admitting dry sterile air by means of the air dryer and sterilizer, Fig. 13, and then constricting the exhaust tube diameter, the feasibility of using ordinary flint-glass in the "all-glass" container, in place of the more expensive "Pyrex" glass and still be able to seal under vacuum, has been made possible.

Ordinary flint-glass test-tubes may be used successfully in dehydrating cultures and viruses. An example of such a tube is shown in Fig. 21. The amount of material to be dried is so very small, usually only about 0.05 ml., that it can easily be confined in a tube of this size, about 7 mm. outside diameter by about 95 mm. in length. The test tube, in Fig. 21, is shown with a straight body 128, while the same tube is shown in Fig. 14 at 101 with a section 129 constricted so that it may be sealed aseptically and under the original vacuum. A slightly modified tube to hold a somewhat greater quantity of material is shown at 102 of Fig. 14. On this tube, however, the connecting tube 103 has been constricted at 129 so that it also may be sealed off while under the original vacuum. These small "test-tube-containers," Fig. 14, hold so little material that efficient dehydration of the content is possible even though they are constricted before attaching to the apparatus. They may, of course, be used during desiccation in their standard size and then constricted after the completion of the dehydration period in the same manner as the larger containers, but before attaching they are more convenient to handle and therefore some time may be saved if they are constricted before use.

Regardless of the size or type of receptacle used, the exhaust tube ought to be reduced in diameter to between 1 and 2 mm., for a sufficient distance to provide ample room for the final sealing after the secondary vacuum has been drawn.

The S type of tube is shown in Fig. 15. Both ends of the body 51 are bent at suitable angles so that, when the tube end 124 is connected as shown in Fig. 3 by means of a rubber tubing 87 to the manifold outlet 86, the other end 125 will make a horizontal connection to the container through another rubber tube 88. A glass-connector-tube of this shape is very desirable for all general-purpose-desiccation. The tube should be rigid but convenient to sterilize, which is necessary before each use. Such a tube in sterilized condition is shown in Fig. 8, ready for assembling with container and manifold.

For use in connection with the small test-tube-container, double or triple outlet L-tubes are provided as shown in Figs. 16 and 17. The connection for a double L-tube is shown at Fig. 14 where the body part 99 is pressed into a stopper of the type shown in Fig. 23 and the rubber stopper then pushed into a suitable cavity 97 of the manifold valve 52. The double tube shown in Fig. 16 has two side outlets 122 and 123 while the triple tube shown in Fig. 17 has two central side outlets 121 in addition to the end side outlet 120. The method for use of these multiple outlet connector tubes is shown in Fig. 14, where two test-tube size containers are connected by means of the rubber tubes 100 to a double L-tube 99. The use of these multiple outlet connector tubes of course represents a tremendous saving in time because, the quantities being so small in the test-tube, a great number of them can be desiccated at one and the same time through these combinations.

*Assembling and connecting to apparatus.*—As mentioned above, all parts should be so constructed that they may be readily sterilized and kept sterile for a reasonable length of time. The S connector-tube shown in Fig. 8 represents a sterilized tube 51 assembled with a sterilized rubber tube 88. To maintain the interior of the tubes in a sterile condition, cotton plugs 104 and 105 are quickly inserted and left there until the connector is assembled with the other parts. In Fig. 8a is shown the ampoule type of container described under Fig. 18 but now in a sterile condition and provided with the cotton plug 106 to maintain sterility of the interior surfaces. In Fig. 9, the container 108 of Fig. 8a has been filled with its material 109 and assembled to the connector tube 51 through the rubber tube 88. The cotton plug 104 is still remaining in the glass connector so as to maintain sterility of the interior surfaces. It should be kept in mind that a plurality of containers must be handled at one and the same time, usually reaching in number from 25 to 50 or more. It is therefore important that, while completing the filling of such a large number of containers, they all may be retained in a sterile condition so that an aseptic product may be obtained. When ready to assemble the filled containers to the manifold of the apparatus, the cotton plug 104 as shown in Fig. 9 is removed and the connector-tube 51 assembled by means of rubber tubing 87 to the hose-stem 86 of manifold valve 52. While making this connection, the valve 52 probably would be in the closed position as indicated in Fig. 11 and remains in the closed position until all of the containers have been connected. That, however, is not necessary with the present invention. Each manifold outlet being provided with a separate valve, the dehydration may commence instantly that one of the containers has been filled and connected to the manifold. It is evident that, during this connecting period, all the manifold valves would be closed until the container has been connected at which time the valve may be instantly opened and the dehydration commenced on that particular container.

*Dehydration procedure.*—Three methods of procedure are in use: (1) prefreezing of the material in the container before starting to desiccate; (2) degassing-self-freezing accomplished by controlling the vacuum during the early stage of the desiccating period; and (3) self-freezing dehydrating.

*Prefreezing.*—With the use of the "Cryochem" apparatus, the low temperature freezing mixtures of the "Lyophile" process are no longer necessary. A temperature of minus 5° to minus 15° C. is usually quite satisfactory. This can easily be produced by a salt-ice mixture spread over and around the containers on the tray 54, or the containers may be chilled and the material prefrozen by resorting to mechanical refrigeration. Dry-Ice of course may be used but the resulting low temperature of minus 50° C. is unnecessary. With the material in the frozen state and the containers 63 properly attached, as described above, to the manifold valve 52, the evacuation is carried out to the limit of the capacity of the pump 22. For extremely labile substances, such as certain viruses, there is evidence that these deteriorate somewhat during "Lyophile" processing and it is therefore of advantage in the "Cryochem" process to maintain a temperature of about minus 10° C., for such products until the desiccation is as complete as is possible to obtain at the aqueous tension differential produced between minus 10° C. and that of the "Drierite." The temperature is then allowed to rise very gradually to that of the room at such a rate that the temperature at any time is never much above that necessary to produce a small further differential in aqueous tension. In this fashion, the temperature of the product is always at a minimum for the amount of residual water still remaining during the final stages of desiccation and deterioration during processing is kept to a minimum.

*Degassing self-freezing.*—If solutions containing protein and/or dissolved gas are placed under high vacuum without first being reduced to the frozen state, they immediately froth and the material in the small individual serum-containers is pushed out through the exhaust tube. Self-freezing of such products in the final containers has therefore not heretofore been feasible. Through this invention, this handicap is overcome by introducing the preliminary step of degassing. After the filled containers have all been connected to the manifold as shown in Fig. 3, the vacuum pump 22 is started but, instead of permitting the pump to operate at its full capacity, it is throttled down so as to keep the pressure at a point where frothing just begins to occur. The throttling down of the pump is accomplished by means of valves 37 and 38, Fig. 1. Valve 38 may be partially opened, thus providing a very effective leak for the pump to take care of or valve 37 may be partly closed, or both valves may be so operated. The system should be kept at this pressure for one quarter to one hour, when sufficient gases will be removed so that de-gassing may be accelerated by further lowering the pressure. As an aid in speeding up the de-gassing period as well as to guard against the loss of material through the exhaust tubes, the freezing trays may be tilted to an angle of about 45° so that the material in the containers will settle in the bottom of the container instead of along the horizontal side as is desirable during the self-freezing period. All through the de-gassing period, there is a slight evaporation of moisture which is sufficient to keep the material in a cooled condition. The time required for the de-gassing period varies with different materials. The de-gassing step should be stopped as soon as permissible so that the self-freezing may be brought about at as early a time as possible by allowing the pump to evacuate to the limit of its capacity. At this point, of course, valve 38 should be closed vacuum-tight and valve 37 fully opened. As soon as the pressure falls to the range of 2.5 to 1.0 mm. Hg, freezing will almost immediately take place and drying from the frozen state proceeds. Although the pressure now is well below the point where boiling ordinarily should occur for the given temperature of the product, this does not happen because the dissolved gases have been removed. Usually the temperature of the substance falls for a time a few degrees below its freezing point so that it is simultaneously super-heated and super-cooled. Freezing will then set in with the suddenness characteristic of that encountered with super-cooled solutions not unlike the sudden crystallization of a super-saturated solution.

In this manner, the advantages of rapid freezing are obtained without the use of refrigerants. Upon the initial freezing, the temperature of course rises to the freezing point but, when freezing is complete and as evaporation proceeds, the temperature falls to the range of minus 10° to minus 20° C. From then on the temperature slowly rises until the dehydration is complete and the container and the material are at room temperature.

*Self-freezing-dehydration.*—The consistency of certain products permits the practice of this most convenient and economical process. All that is required is to connect the filled sterile containers, start the desiccation and let this proceed for the time required to obtain the desired dryness.

*The product of the degassing-self-freezing process.*—Inasmuch as there is a slight degree of desiccation from the liquid state, the final appearance of the product is one of a highly porous mass covered with a glossy amorphous film. The product dissolves with remarkable speed and completeness; in fact, with certain products, there is some indication that the solubility-characteristics may be superior to those produced when other means of preliminary freezing are used.

*Time required for dehydration.*—Under some conditions, the time required for the completion of desiccation by the present invention is reduced to one-half or one-third of that required by devices heretofore available. The time required varies with the thickness of the layer of the material in the container and with the nature of the material itself. Usually it is safe to allow half again as much time as is required for the temperature of the containers to reach that of the room. Because of varying conditions and the many different substances that are successfully dehydrated by this process, it is preferable to allow the determination of residual moisture-content to decide the duration of processing. The purpose for which the product is preserved should naturally also be taken into consideration when deciding on the permissible residual moisture-content.

The residual moisture-content of serum-like substances (calculated in terms of the weight of the dry solids) may be reduced to below 2% by the use of the present invention. If sufficient processing time is allowed, the final moisture-content can be reduced to less than 0.1% which corresponds to 99.99% removal of the original water. The time may therefore be different for every product and may vary from 10 to 25 or 30 hours as determined by the final dryness desired for the product.

*Air-dryer and sterilizer.*—In order to seal-off the dehydrated material in its container in an aseptic condition, a new and novel "dry-air-sterilizer" (Fig. 13) is required. This may consist of an ordinary syringe barrel containing a properly confined chemical desiccant and a standard Luer needle attached to it. In Fig. 13, the barrel, which may be of cylindrical or any other convenient shape and of suitable length, is shown at 115. One end of the barrel may be opened or provided with a removable or hinged cover (not shown), while the other end is reduced into a hollow needle 110 so that the rubber connectors 88 may be easily pierced for the admittance of dry sterile air. The reduced portion 110a may be formed into a neck provided with suitable means for the attachment of a syringe needle. In the bottom of the barrel occupying about one-quarter of the space is placed a bacterial filter such as sterile cotton 116. One-third of the remaining space is filled with a regenerable chemical desiccant 117 and on top of this is placed another cotton plug 116, occupying about half the remaining space. The air dryer sterilizer is prepared by heating in an ordinary oven for a half-hour at a temperature of 200° C. "Drierite" is preferred as the desiccant in the barrel and this being a regenerable material the device, of course, can be used an indefinite number of times because the re-sterilizing process, at the same time, regenerates the desiccant. To prevent contamination or the loss of effectiveness of the desiccant, stoppers (not shown) may be used at both ends, thus keeping the instrument ready for immediate use.

The air-dryer-sterilizer is a simple device but, without it and its proper use, the sealing of the dehydrated product into the protecting receptacle in an aseptic condition would be impossible. The invention of this device, therefore, is of utmost importance in the successful practice of the process herein described. Although it may be considered to be an instrument detached from the rest of the apparatus, it is definitely a necessary part of it and indispensable in the practice of the one most important method of sealing herein described.

*Sealing procedure.*—The method used and the care taken in sealing the containers depends, of course, upon the type of product being processed. Through the practice of this invention, three methods are available and have proved very satisfactory:

(1) *Aseptic.*—When the product must be preserved in an aseptic condition, the procedure to follow is to shut the individual manifold valves 52 (Figs. 3 and 11), admit dry, sterile air to an evacuated container 108 through the use of the air-dryer-sterilizer shown in Fig. 13 by piercing the rubber-tube-connector 88 with the syringe needle 109 as shown in Fig. 11. After the dry, sterile air has been admitted, the exhaust tube 107 can be constricted at 111 for a distance of 10 to 15 mm., to a diameter of about 1-2 mm. by means of a gas-flame 112. As soon as constricting is finished, valve 52 is again opened and re-evacuation of container 108 proceeds. The same procedure is carried through, one by one on the remaining containers, the pump 22 in the meantime being in continuous operation to keep the system at a low pressure and in aseptic condition. After a few minutes of evacuation, container 108 is ready for the sealing operation and is sealed, Fig. 12, by applying a gas-flame 112 at section 114, previously prepared by constricting. While sealing-off, the container 108 is severed from the assembly and we have the finished product as shown in Fig. 12a. The particular form or shape of container as shown and described in this connection is only one of several types now in use and referred to here as being a preferred type, but we do not limit ourselves to the particular shape nor to size and proportion specified.

The finished product is an "all-glass" receptacle, Fig. 12a, containing a dry (99.9%) very porous substance 113, with properties as described above, occupying approximately the same space in the container 108 as the original liquid, imperviously sealed aseptically and in vacuo for storage for an indefinite length of time at any convenient temperature. At the time of use of the product, sterile, distilled water is admitted from a syringe through the exhaust tube 107 which should be previously prepared by marking a file scratch at 107a so that the sealed portion can easily be broken off. The dry material readily dissolves and is quickly restored to its original consistency or to the consistency desired.

Containers such as those shown in Figs. 14 and 21 are treated in exactly the same manner as described above for all-glass containers.

Containers such as those shown in Figs. 19 and 20, which are provided with a vaccine stopper, are sealed aseptically in the same manner as that described above for the all-glass container. The preserved material, however, within the receptacle is restored by admitting sterile distilled water by means of a syringe, the needle being pushed through the thin membrane indicated at 132 in Fig. 25 and at 134 in Fig. 24, the vacuum within materially aiding in dissolving the material.

(2) *Non-aseptic.*—All products do not require to be sealed in a perfectly aseptic condition. At the end of the dehydration period on such products, the pump 22 may be shut down and valve 37 (Fig. 1) closed. Air may then be slowly admitted into the system by opening valve 38. The air so admitted becomes dry on its way through the desiccant chamber 21 before reaching manifold 58 and the container 53. When atmospheric pressure has been restored within the desiccating system, the manifold valve 52, Fig. 3, may be closed and the containers 53, one by one, removed from the manifold connection and the exhaust tube 107, Fig. 11, constricted as indicated at 111. Each container 108 with its now constricted exhaust tube 111 may again be connected to the manifold but we have found it more convenient to attach the containers directly to a vacuum pump for the purpose of producing a secondary vacuum in the container before sealing, which is accomplished in a manner similar to that shown at 114, Fig. 12. Connecting directly to a vacuum pump is for the purpose of affecting rapid evacuation. Evidence indicates that, for ordinary biologics, a vacuum of 1 mm. to 0.2 mm. is quite satisfactory. The process of restoring such products is, of course, identical with that described for the aseptic product.

(3) *Non-vacuum storage.*—Sealing in vacuo is unnecessary for certain products, such as human milk; in any event, however, the container must be hermetically sealed in order to exclude moisture. Ordinary nursing-bottles of the type shown in Fig. 22 are suitable for such products. We have found that for a product of this kind and containers of the type referred to, the filling of one-quarter the capacity is the most efficient proportion, allowing for very rapid completion of desiccation. The containers are assembled to the sterile connectors of the manifold by placing a stopper of the type shown in Fig. 23 in the neck 119, Fig. 22. At the end of the desiccating period, sterile air is admitted, the processing stopper, Fig. 23, is removed and a stopper of standard vaccine type, Fig. 24, quickly introduced into the neck 119 with aseptic precautions.

It is, of course, understood that, in cases where vacuum storage is not necessary, any one of the containers, whether it be the all-glass or the combination rubber-glass type, may be sealed off hermetically without re-evacuation after the air has been admitted either aseptically or otherwise. Likewise an inert gas such as nitrogen or argon may be admitted in place of the air.

*General dehydration procedure.*—When used as a dehydrator, the valve 60, Fig. 1, is tightly closed. The manifold valves 52, Fig. 3, may if so desired all be closed and the valve 37 opened while the valve 38 is tightly closed so that evacuation may commence and the air within the voids of the desiccant 47 will be partially removed while the containers are connected to the manifold outlet. The containers are only filled to about ½ their capacity and attached to the manifold so that they rest on the screen 91 of the tray 54. When using the small containers shown in Fig. 21 for dehydrating micro-organisms, the arrangement shown in Fig. 14 is used. These containers being so small, the use of tray 54 is not necessary. When de-gassing, self-freezing is practiced, the trays are placed so as to support the containers 53 at an angle of about 45° but as soon as the de-gassing period is completed the trays 54 are returned to the horizontal position. For products requiring pre-freezing, any ordinary method of freezing may be employed such as water-ice and salt mixtures, dry ice or mechanical refrigeration. Evacuation is carried out to the limit of the capacity of the pump and the pressure preferably kept between 700 and 300 microns for the required time which may be anywhere from 10 to 30 hours or more. The construction of our apparatus is so simple that during this period it will require no attention excepting an occasional check-up to see that no leaks have opened or the vacuum-producing means have failed. The apparatus described in this invention may be run for a period greatly in excess of that required for the dryness desired and no bad effects caused either to the product being processed or to the desiccant, or without additional energy costs except for the running of the vacuum pump.

When the desired dryness of the product is obtained or later when convenient, the containers 53 are sealed-off in any convenient manner or according to one of the three methods heretofore described. One of the resulting products obtained through the use of our invention is shown in Fig. 12a. This is the ampoule type "all-glass" container with the dehydrated material 113 sealed into the container 108 aseptically and under vacuum. We do not limit ourselves to the particular shape, sizes, combination glass and rubber container, etc., shown and described herein.

*Regeneration of the desiccant.*—When used as a regenerator, Fig. 2, valves 37 and 38 are closed and valve 60 opened to the air-heater-circulator 24. The lid or cover 26 shown in Fig. 1 is removed and replaced by a loose-fitting disk 27, Fig. 2, for the purpose of permitting the air to escape slowly as it rises between the desiccant baskets 46 or through the desiccant 44. The regenerating temperature required is between 150 to 250° C.; 180° being preferred. The current of air should pass rapidly into the desiccant chamber and be maintained within the temperature range mentioned in order that rapid regeneration may be obtained. The air enters through duct 40 at the bottom of the desiccant chamber and, as the "Drierite" rises in temperature, the water which it contains is evolved. At the beginning of the regeneration cycle, the regeneration zone is in the lower portion of the chamber. As the supply of heat is continued, the regeneration zone gradually rises until it reaches the top of the chamber. Regardless of the type of desiccant basket used, thermometers are provided as indicated at 43a so that the temperature can be checked from time to time. When the temperature indicated by a thermometer placed in thermometer well 43 or into the desiccant 47 of the top basket shown in Fig. 1 reaches 150° C., it is an indication that regeneration has been completed. At a given temperature, the time of regeneration is a function of air-circulation and layer-thickness. In four hours it will ordinarily be completed, but this should be checked under actual conditions and for that purpose we have provided the test plug 79, shown in Fig. 5, within the basket.

By removing this test plug from the desiccant chamber and making a moisture determination in the desiccant at various points, the condition of the desiccant may be determined. In the apparatus shown in Fig. 1, the desiccant 47 is conveniently accessible and the ordinary methods for moisture determination are used. Upon completion of the regenerating period, the "Drierite" should not contain more than 0.3% moisture. As soon as the regeneration is completed, the insulated disk 27 is removed and cover 26 shown in Fig. 1 loosely placed on top of the chamber 35 to prevent contamination. Naturally, the desiccant chamber 35 and the manifold 58 as well as other connecting parts all are sterilized during the regeneration period and, as soon as the desiccant has cooled down to room temperature, the apparatus is ready for use as a dehydrator.

Instead of using the open system as described above for the regeneration of the desiccant, we have found it more economical to use a closed system and recirculate the heated air. Such an arrangement is indicated by the duct 70a shown in dotted outline connecting a suitable opening in lid 28 with the intake 70. When this system is used, a few of the manifold valves 52 are left open to permit some of the hot air to escape and carry off the released water vapors. We do not intend to be limited save as the scope of the attached claims may require.

We claim:

1. An apparatus providing means for treating biological material for preservation by dehydrating through the action of a regenerable chemical desiccant and vacuum and for regenerating the desiccant comprising, a desiccant chamber, a solid, porous, regenerable chemical desiccant within said chamber, a plurality of outlets communicating with said chamber and suitable for use as container connectors, a plurality of outlet valves each located at an angle of approximately 45° above horizontal and associated with one of said outlets so as to control the communication of said outlet with said chamber, and vacuum-producing means communicating with said chamber for the removal of air.

2. An apparatus providing means for treating biological material for preservation by dehydrating through the action of a regenerable chemical desiccant and vacuum and for regenerating the desiccant comprising, a desiccant chamber, a solid, porous, regenerable chemical desiccant in said chamber in a proportion of not substantially less than 100 pounds of desiccant to every 500 milliliters of biological material to be treated, a plurality of ducts suitable for the attachment of containers for biological material and communicating with said chamber, and vacuum-producing means communicating with the interior of said chamber.

3. An apparatus providing means for treating biological material for preservation by dehydrating through the action of a regenerable chemical desiccant and vacuum and for regenerating the desiccant comprising, a desiccant chamber, a regenerable chemical desiccant in said chamber, a plurality of outlets adapted for the connection of containers for said biological material and communicating with said chamber, vacuum-producing means communicating with the interior of said chamber to remove air, means for admitting air to said chamber for the regeneration of said desiccant, and a heater located so as to heat air passing through said last-mentioned means to said chamber.

4. An apparatus providing means for treating biological material for preservation by dehydrating through the action of a regenerable chemical desiccant and vacuum and for regenerating the desiccant comprising, a desiccant chamber, a regenerable chemical desiccant in said chamber, a plurality of outlets adapted for the connection of containers for said biological material and communicating with said chamber, vacuum-producing means communicating with the interior of said chamber to remove air, means for admitting air to said chamber for the regeneration of said desiccant, a heater located so as to heat air passing through said last-mentioned means to said chamber, and a valve controlling the flow of air through said last-mentioned means.

5. An apparatus providing means for treating biological material for preservation by dehydrating through the action of a regenerable chemical desiccant and vacuum and for regenerating the desiccant comprising, a desiccant chamber, a regenerable chemical desiccant within the chamber, a perforate container in said chamber and surrounding at least a portion of said desiccant, a plurality of outlets adapted for the connection of containers for said biological material and communicating with said chamber, and vacuum-producing means communicating with the interior of said chamber for the removal of air.

6. An apparatus providing means for treating biological material for preservation by dehydrating through the action of a regenerable chemical desiccant and vacuum and for regenerating the desiccant comprising, a desiccant chamber, a regenerable chemical desiccant within the chamber, a perforated support retaining said desiccant in said chamber so as to provide a tortuous path for fluid through said chamber and through said desiccant, a plurality of outlets adapted for connection with the containers of said biological material and communicating with said chamber, and vacuum-producing means communicating with the interior of said chamber for the removal of air.

7. The method of treating and packaging biological material for preservation which comprises, filling at least one clinical dose of biological material into a receptacle to approximately 50% of its capacity, said receptacle being suitable as a final container for protection, distribution and restoration for use of its contents and having an exhaust tube, connecting said receptacle to a vacuum apparatus containing a regenerable chemical desiccant under sterile and aseptic conditions with a piercible connector, freezing the biological material into a solid by rapidly lowering the pressure, dehydrating the material by sublimation through the action of a regenerable chemical desiccant and vacuum until dry, closing the connection between said apparatus and said receptacle, piercing said connector and admitting dry sterile air therethrough to said receptacle, constricting said exhaust tube, drawing a secondary vacuum, and sealing off to maintain asepsis.

8. The method of treating and packaging biological material for preservation which comprises, filling at least one clinical dose of biological material into a receptacle to approximately 50% of its capacity, said receptacle being suitable as a final container for protection, distribution and restoration for use of its contents and having an exhaust tube, dehydrating the biological material by sublimation through the action of a regenerable desiccant and vacuum until dry, admitting dry air to the receptacle, constricting the exhaust tube, subjecting the biological material to a sub-atmospheric pressure, and sealing off the exhaust tube to produce a final package ready for storage or distribution.

9. The method of treating and packaging biological material for preservation which comprises, filling at least one clinical dose of biological material into a receptacle to approximately 50% of its capacity, said receptacle being suitable as a final container for protection, distribution and restoration for use of its contents and having an exhaust tube, connecting said receptacle to a vacuum apparatus containing a regenerable chemical desiccant and having a manifold valve, dehydrating the biological material by sublimation through the action of said regenerable chemical desiccant and vacuum until dry, closing said manifold valve, detaching the receptacle with its dry content thereby admitting air, constricting said exhaust tube, attaching said exhaust tube to a vacuum-producing means and drawing a secondary vacuum, and sealing off the exhaust tube while under the secondary vacuum, thereby producing a non-aseptically sealed package ready for storage or distribution.

10. The method of treating and packaging biological material for preservation which comprises, filling at least one clinical dose into a receptacle to not more than 75% of its capacity, said receptacle being suitable as a final container adapted for protection, distribution and restoration for use of contents, dehydrating the biological material by sublimation through the action of a regenerable chemical desiccant and vacuum until dry, admitting dry sterile air to said receptacle, and sealing said receptacle to produce a final package ready for storage or distribution.

11. A process of treating and packaging biological material for preservation which comprises, filling biological material into a receptacle adapted to serve as a final container for the biological material for protection, distribution and restoration for use, reducing the temperature of the material to not more than −10° C., desiccating the material at not more than −10° C. by means of a solid, porous, regenerable chemical desiccant and subatmospheric pressure until the desiccation is as complete as is possible to obtain at the aqueous tension differential between −10° C. and the temperature of the desiccant, raising the temperature of the material very gradually to room temperature at such a rate that the temperature at any time is never much above that necessary to produce a small further differential in aqueous tension, and sealing the receptacle.

12. The method of treating and packaging biological material for preservation which comprises, filling at least one clinical dose into a receptacle to not more than 75% of its capacity, said receptacle being suitable as a final container adapted for protection, distribution and restoration for use of contents, dehydrating the biological material by sublimation through the action of (1) a solid, porous chemical desiccant heat-regenerable without fusion and (2) vacuum until dry, admitting inert gas to said receptacle, and sealing said receptacle to produce a final package ready for storage or distribution.

13. The method of treating and packaging biological material for preservation which comprises, filling said material into a receptacle having an exhaust tube to approximately 50% of the capacity thereof, subjecting said material in said receptacle to freezing conditions, thereby converting the same into a solid, dehydrating the material by sublimation of moisture contained therein by subjecting the material to an atmosphere of reduced pressure, which atmosphere is in contact with a solid, porous, regenerable chemical desiccant spaced from said material until substantially dry, thereafter admitting dry sterile air to said receptacle, thereafter constricting said exhaust tube, thereafter subjecting the material in said receptacle to a vacuum and sealing off the constricted exhaust tube to maintain asepsis.

14. The method of treating and packaging biological material for preservation which comprises, filling said material into a receptacle having an exhaust tube to a portion of the capacity thereof, subjecting said material in said receptacle to freezing conditions, thereby converting the same into a solid, dehydrating the material by sublimation of moisture contained therein by subjecting said material to a vacuum until substantially dry, thereafter admitting dry sterile air to said receptacle, thereafter constricting the exhaust tube of the receptacle, thereafter subjecting the material in said receptacle to a vacuum and sealing off the constricted exhaust tube to maintain asepsis.

15. A process of treating and packaging biological material for preservation which comprises, filling biological material into a receptacle adapted to serve as a final container for the biological material for protection, distribution and restoration for use, reducing the temperature of the material to not substantially more than −10° C., desiccating the material at not substantially more than −10° C. under sub-atmospheric pressure until the desiccation is substantially complete, and sealing the receptacle.

16. The method of treating and packaging biological material for preservation which comprises, filling said material into a receptacle having an exhaust tube to a portion of the capacity thereof, subjecting said material in said receptacle to freezing conditions, thereby converting the same into a solid, dehydrating the material by sublimation of moisture contained therein by subjecting said material to a vacuum until substantially dry, thereafter admitting dry sterile gas to said receptacle, subjecting the material in said receptacle to a vacuum and sealing off the exhaust tube to maintain asepsis.

17. The process of desiccating substances labile in an aqueous state and which deteriorate on desiccation at about −3° C. which comprises placing such aqueous substance into a receptacle, reducing the temperature of the substance to not substantially more than −10° C., desiccating the said substance at not substantially more than −10° C. under subatmospheric pressure until desiccation is substantially complete, and subsequently sealing the receptacle.

18. The process as in the preceding claim in which, after desiccation has proceeded at the low temperature not substantially more than −10° C. to substantial completion, the temperature is gradually raised while the subatmospheric pressure is continued so that desiccation proceeds at gradually increasing temperature and deterioration during desiccation is kept at a minimum.

EARL W. FLOSDORF.
CHARLES J. WESTIN.
F. J. STOKES, Jr.